United States Patent [19]

Elattar

[11] Patent Number: 4,515,901
[45] Date of Patent: May 7, 1985

[54] METHOD OF PREPARING PILLARED, INTERLAYERED CLAY CATALYST USING SOLUBLE CARBOHYDRATES

[75] Inventor: Azza A. Elattar, Wappingers Falls, N.Y.

[73] Assignee: Texaco Inc., White Plains, N.Y.

[21] Appl. No.: 552,900

[22] Filed: Nov. 17, 1983

[51] Int. Cl.³ .............................................. B01J 21/16
[52] U.S. Cl. ...................................... 502/63; 502/80; 502/84
[58] Field of Search .................... 502/62, 80, 84, 63

[56] References Cited

U.S. PATENT DOCUMENTS

| | | | |
|---|---|---|---|
| 2,934,504 | 4/1960 | Talvenheimo et al. | 502/62 |
| 3,298,849 | 1/1967 | Dohman et al. | 502/62 X |
| 4,159,994 | 7/1979 | Seto et al. | 502/62 X |
| 4,176,090 | 11/1979 | Vaughan et al. | 502/84 X |

*Primary Examiner*—Carl F. Dees
*Attorney, Agent, or Firm*—Robert A. Kulason; James F. Young; James J. O'Loughlin

[57] ABSTRACT

An interlayered pillared clay is formed by the steps of mixing a clay with a polar solvent, a soluble carbohydrate, and a soluble pillaring agent. The mixture is then heated to form the interlayered pillared clay. Useful clays are smectites such as montmorillonite.

24 Claims, No Drawings

METHOD OF PREPARING PILLARED, INTERLAYERED CLAY CATALYST USING SOLUBLE CARBOHYDRATES

BACKGROUND OF THE INVENTION

The present invention relates to a method of forming an interlayered clay catalyst, and more particularly the use of a soluble carbohydrate as a swelling agent in the formation of such a clay catalyst.

The clay minerals, especially natural and synthetic smectites such as bentonite, montmorillonite and hectorite have a layered structure which can be schematically represented as a sandwich comprised of two outerlayers of silicon tetrahedra and an a inner layer of alumina octahedra. These sandwichs or platelets are stacked or layered one upon the other to yield the unit cells of the clay. Generally, the platelets have basal spacings of about 9.6 angstroms. Swelling of these clays is possible because the parallel lamellae in these structures are bonded to each other not covalently but by Van der Waals and electrostatic forces. There has been a considerable amount of work done to increase the basal spacings of the platelets by a fixed, controlled amount up to about 30 or 40 angstroms. Various polar materials such as water, glycols and amines have been added in an attempt to produce this wider separation. However, such materials tend to be unstable at high temperatures which results in the collapse of the platelets.

More recently, pillars of various metals, generally metal oxide complexes, have been added to the clays to increase the interplatelet distances. These are generally more stable towards heat. In U.S. Pat. No. 4,367,163, pillars of silica have been added to smectites for this purpose, by the use of a solvent to swell the clay, and ionic silicon complex impregnates to form the pillars. In U.S. Pat. No. 4,176,090, pillars of stable inorganic polymers of oxides of metals such as aluminum, zirconium or titanium were added. Other methods of forming pillared catalyst are set forth in U.S. Pat. Nos. 4,248,739 and 4,238,364.

However, the prior art methods of forming the clay having the desired distances between platelets have involved many steps. Multistep processes are not suitable for the production of large quantities of the desired pillared clays, since such processes require the expenditure of large quantities of energy. Further, many prior art processes use expensive and difficult to manufacture reactants, increasing the difficulty of formulating a useful commercial process.

SUMMARY OF THE INVENTION

It now has been discovered that a pillared interlayered clay having the desired distances between platelets can be easily and readily formed by combining the clay with water, alcohol or another polar solvent, a soluble carbohydrate (as a swelling agent), and a pillaring agent. When the mixture is heated to an effective temperature, a pillared interlayered clay is formed having a desired distance between platelets. The catalyst is stable to higher temperatures, between about 100° and 600° C. because of the presence of the pillars and the fact that the carbohydrate can be eliminated during the heating process since its presence in the final product is not necessary for the proper functioning of the pillared interlayered clay and any catalyst formed therefrom.

PREFERRED EMBODIMENTS OF THE INVENTION

In a preferred method of the present invention, a smectite type clay is combined with water, or a liquid alcohol or other polar solvent and a soluble carbohydrate. The mixture causes the clay to swell increasing the distance between the platelets of the clay particles. The addition of a pillaring agent which is preferably a metallic or an organometallic compound to the swollen clay forms pillars between the platelets. Upon the heating of the mixture, the water or other solvent evaporates. The temperature used can be high enough to decompose the carbohydrate, however, the presence of the pillars between the platelets effects a continued separation of the platelets. Since the pillars are composed of metallic compounds they are stable to relatively high temperatures, permitting the clay to be used as a catalyst and as a support for catalytic metals in many processes including those of the petroleum industry. This method of the formation of the pillared clay insures that the pillared clay or a catalyst formed from the clay can be successfully used in various applications. It has also been found that the use of the method of the present invention greatly increases the surface area of the clay.

Clays suitable for use in the present invention are those that are capable of swelling in the presence of a polar solvent and a carbohydrate and which are further capable of bonding with the pillaring agent. Suitable clays include the smectites and their synthetic analogs. A presently most prefered clay is montmorillonite. Such clays and their synthetic analogs are well known in the art. When dehydrated, the smectites have basal spacing, as measures by x-ray defraction of between about 9 and 9.6 angstroms. Commerically available smectites also include bentonite, beidellite, hectorite, saponite, sauconite, and nontronite.

Suitable carbohydrates which act as swelling agents and which are soluble or partially soluble in polar solvents, as water and alcohol, are well known in the art. Useful soluble or partially soluble carbohydrates include monosaccharides such as arabinose, ripose, xylose, glucose, fructose, mannose and galactose. Other useful soluble carbohydrates include oligosaccharides which are low molecular weight condensation polymers containing from about 2 to about 10 monosaccharide units. The oligosaccharides include disaccharides such as succrose which is a dimer of glucose and fructose. Other saccharide polymers which are soluble in polar solvents are also useful in the process of the present invention.

The pillaring agent is preferable a metallic or organometallic compound which is soluble in water, alcohol or another polar solvent. One requirement of the pillaring agent is that the metallic or organometallic compound form the desired pillar upon the drying of the clay containing mixture. The larger the metallic compound which is added to the clay the wider is the separation between the platelets of the clay and the larger is the interplatelet distance. The pillars that are formed are generally formed of sub-groups of metal oxygen linkages, or metal to metal linkages, or metal to oxygen to metal linkages. Preferred pillaring agents include inorganic salts of metal oxides, organo compounds of metal oxides, inorganic metal containing salts of various inorganic functional groups and simple organo-metallic compounds. Preferably the pillaring agents beyond being soluble in water, liquid alcohols or other polar solvents also form charged radicals in solution. These charged radicals are in turn able to interclate with the clay layers to form the desired pillars. Preferred metals for use in the pillaring agent include boron, silicon, aluminum, zinc, phosphorus and magnesium. Preferred pillaring agents can also include the following: disilanes, trisilanes, siloxanes, silicates, metal isopropoxides, soluble metal salts of acetate, carbonate, and oxalate. Preferred pillaring agents include boric acid, alkyl silicates which among others include diethoxydisilane, hexaethoxydisilane, methylsilicate, ethylsilicate and hexaethoxydisiloxane.

The mixture of clay, pillaring agent, carbohydrate and polar solvent is heated. The heating can be one step or can be divided into separate steps. Most preferably the mixture is first heated at about 100° C. to dry it. The dried mixture is then heated to a higher temperature such as between about 100° and 600° C., and most preferably between about 350° and 500° C. for about 2 hours. Heating the mixture to a high temperature decomposes the carbohydrate in many cases causing it to be removed from the interlayered clay making the pillared interlayered clay stable to high temperatures, various solvents and other chemical compounds with which the interlayered clay can come into contact with while being used.

Due to the large pore size of the pillared clays produced by the process of the present invention, molecules larger than those customarily diffusible through zeolites will diffuse into the interlayered clays produced by the process of the present invention. The larger pore sizes, ranging up to about 30 or 40 angstroms, permits the separation of cyclic molecules and isomers from mixtures.

The addition of catalytic metals, such as Group VIII metals of the Periodic Table of Elements permits catalytic activity to occur within the pillared interlayered clays. Catalytic metals can be readily added to the clays of the present invention by simple impregnation. In such methods, the clays are contacted with a soluble or complexed catalytic metal or metals, the solvent is then evaporated to provide a quantity of catalytic metal on the surface of the platlets of the interlayered pillared clay. Because of the specific interlayer distances produced by the pillars, the reaction occuring within the catalytic metal impregnated, pillared clay is limited to molecules which can fit into the space between the pillars. This leads to a shape selective catalyst which can produce molecules of a certain shape and size. This is desirable in many reactions wherein certain small molecules are desired to be made and not polymers or higher weight molecules which are generally made by many catalytic reactions.

In the formation of the pillared clay, the quantity of carbohydrate used can be from about 1% to about 50% by weight or more of the mixture, however it is preferred to use between about 3 to about 5% by weight of the mixture. Similarly the pillaring agent can comprise from about 10% to more than about 80% by weight of the mixture, preferably though the pillaring agent comprises from about 20% to about 80% by weight of the mixture, and most preferably from about 40% to about 70% by weight of the mixture. The quantity of solvent used is preferably just sufficient to form a workable mixture of the clay and other components however, larger quantities of solvent can be used.

The invention would be better understood from the following examples which are illustrative and are not meant to limit the invention.

EXAMPLE I

To about one gram of montmorillonite was added about 5 milliters of water, and the two were mixed well to form a paste. The paste was then oven dried for a period of about two hours at about 125° C. The dried product was then stabilized by heating at a temperature of about 500° C. for about two hours. The change in the interlayer or interplatlet distance (basal plane d(001)) was measured by x-ray defraction. The basal plane for the clay formed by the addition of only water and subsequent heating was about 9.8 angstroms.

EXAMPLE II

To about one gram of montmorillonite was added about 0.4 gram of boric acid (0.06 mole) which was dissolved in the least amount of water. As in Example 1, the materials were mixed, dried for two hours at 125° C., and then heated at about 500° C. for about two hours. The basal plane d(001) for this clay was found to be also about 9.8 angstroms.

EXAMPLE III

To about one gram of montmorillonite was added about 5 milliliters of an about 3% by weight aqueous solution of table sugar (sucrose). As above, the materials were mixed and oven dried for about two hours at 125° C. The mixture was then heated for about 2 hours at about 500° C. The basal plane d(001) was measured at about 9.9 angstroms.

EXAMPLE IV

To about one gram of montmorillonite was added about 0.4 gram of boric acid dissolved in about 7 milliliters of an about 3% by weight aqueous solution of table sugar (sucrose). The materials were mix into a paste, dried at about 125° C. for about two hours and then heated at about 350° or 500° C. for about two hours. The basal d(001) plane was then measured and found to be about 12.28 angstroms. When the mixture was heated at a temperature of about 600° C., instead of 500° C. for about two hours, the basal plane d(001) was found to be about 11.8 angstroms.

From the above examples it can be seen that the addition of either boric acid or table sugar alone to the clay does not permanently increase the basal plane beyond that of the original clay. However, the addition of both boric acid and table sugar does produce a pillared interlayered clay with a much larger basal plane. The interlayered distance increasing from about 9.8 to about 12.3 angstroms.

EXAMPLE V

A mixture was made as an Example IV, however, the table sugar was replaced with xylose. After calcination at about 500° C. for about two hours, the basal plane d(001) found to be about 12.74 angstroms. It can be seen that the combination of boric acid and a monosaccharide produces the desired pillared interlayered clay having a larger interlayer distance.

EXAMPLES VI-IX

Four mixtures were made in the manner of Example II, without a carbohydrate, and instead of the boric acid, the added pillaring agent was either ethylsilicate, phosphoric acid, aluminum isopropoxide or hexaethoxydisiloxane. After heating at about 500° C. for about two hours, all of the pillared interlayered clays had basal planes d(001) of about 9.8 angstroms, as in Example II.

EXAMPLES X-XIII

When four pillared interlayered clays were made as in Example IV using sucrose, but having the boric acid replaced by ethylsilicate, phosphoric acid, aluminum isopropoxide or hexaethoxydisiloxane, respectively, the basal plane d(001) was measured at 16.2, 12.7, 12.6, and 16.3 angstroms, respectively.

As can be seen from Examples VI-XIII, the use of a pillaring agent without a carbohydrate does not cause a permanent expansion of the basal plane. However, the use of a pillaring agent and a carbohydrate here sucrose which is a disaccharide, does increase the basal plane by an amount depending on the bond length of the pillaring agent. Further, it has been found that the use of the pillaring agent greatly increases the surface area of the resulting pillared interlayered clay. The montmorillonite of Example XIII had a initial surface area of about 27.5 square meters per gram, however, after being mixed and heated with the succrose and hexaethoxydisiloxane, the surface area was increased to about 144.3 square meters per gram. When ethylsilicate was used as the pillaring agent, the surface area was increased to about 226.3 square meters per gram.

EXAMPLES XIV-XXI

Five mixtures were formed by adding to about one gram of montmorillonite a few crystals, about 0.1 gram, about 0.2 gram, about 0.5 gram, and about 1 gram of table sugar (sucrose), respectively, all with 7 milliters of water. The five mixtures were dried at about 125° C. for about two hours and then heated at about 500° C. for about two hours. The heat treated clay formed using only a few crystals of sugar and that formed using about 0.1 gram of added sugar had a basal plane d(001) of about 9.6 angstroms. The clays formed by the addition of the 0.2 gram, 0.5 gram and 1 gram of sugar all had basal planes d(001) of about 12.6 angstroms. However, when similar mixtures containing 0.2, 0.5 and 1 gram of sugar were made and heated at a temperature of about 600° C. for two hours, instead of 500° C., the basal planes d(001) were all measured by X-ray defraction at about 9.8 or 9.9 angstroms. This shows that the clays formed by the addition of only table sugar, generally about 20 weight % or more, will swell and have an increased distance between the platelets or layers, however, such clays are not stable to high temperatures. This is apparent from the clays which were heated at 600° C. which heating collapsed the clay layers back to their original basal plane distances with slight degradation.

EXAMPLES XXII-XXXI

Mixtures were made as in Examples XIV through XVIII using a few crystals, about 0.1, 0.2, 0.5 and 1 gram of table sugar. However, the table sugar was added to a mixture of about 1 gram of montmorillionite and 0.4 gram of boric acid dissolved in 7 milliliters of water. After forming the mixtures and drying them at about 125° C., the mixtures were heated at about 500° C. for about two hours. The basal planes d(001) of the resulting clays were measured to be between about 12.2 and 12.9 angstroms. When similar mixtures containing boric acid and a few crystals, about 0.1, 0.2, 0.5 and 1 gram of table sugar were made but heated at a temperature of about 600° C. for about two hours, the basal plane d(001) distances were about the same as those made at 500° C., ranging from about 11.8 angstroms when only a few crystals of sugar were used to about 12.9 angstroms when one gram of sugar was used.

Comparing Examples XXII-XXXI to Examples XIV-XXI shows that in the process of present invention when a carbohydrate swelling agent is combined with a pillaring agent, here boric acid, the pillared interlayered clays produced thereby not only have increased interplane distances but that such clays are stable at higher temperature. The decomposition of the swelling agent, here table sugar or sucrose, has only a minimal effect on the interlayer distances, expecially at lower concentrations of sugar. This is because the sucrose only causes the platelets or layers to separate (expand) and permits the pillaring agent to enter and react forming pillars, that once these pillars are formed, the sucrose can be removed, such as by heating, and that further heating does not effect the pillars due to their inorganic state and the strong metal to oxygen bonds found within the preferred clays. The absence of sucrose in the pillared interlayered clay can be seen by comparing a chemical analysis of the clay of Example I and Example X. The original montmorillionite clay had an organic carbon content of about 0.4% by weight. The pillared interlayered clay formed with the ethylsilicate and sugar in ethanol of Example X when heated at a temperature of about 500° C., high enough to decompose the sugar, had a organic carbon content of only 0.55%, thus indicating that the sugar was no longer present. The pillared clay, however, still retained the desired basal plane d(001) distance of about 16.2 angstroms while the clay unit layers are preserved.

EXAMPLE XXXII

Montmorillonite having a basal plane d(001) of about 9.6 angstroms was exposed to water vapor for about 48 hours. The basal plane d(001) distance increased to about 14.9 angstroms indicating that the water vapor caused the clay to swell. When the interpillared clay formed in Examples IV and X was also exposed to water vapor for about 48 hours, there was no increase in the basal plane d(001) distances. This indicated a structural stability of the pillared interlayered clay formed by the process of the invention and shows a rigidity of the pillars between the layers.

EXAMPLES XXXIII-XXXIV

To compare the activity of the original montmorillonite and the pillared interlayed clay formed in Example X, a sample of each was conventionally impregnated or loaded with cobalt carbonyl. The two samples were then subjected to a stream of carbon monoxide and hydrogen.

The montmorillonite contained about 6.9% by weight cobalt and the pillared clay of Example X formed with ethylsilicate and sucrose contained about 5.5% by weight cobalt. Both were subjected to a gas having a ratio of about two moles of hydrogen to one mole of carbon monoxide, at a pressure of about 400 psig, at a temperature of about 288° C., and at a GHSV of about 715. The cobalt containing monmorillonite converted an insignificant portion of the carbon monoxide to hydrocarbons. However, the cobalt containing pillared clay catalyst of Example X converted about 43.3% of the carbon monoxide into hydrocarbons. The resulting hydrocarbons were about 34 mole percent methane, about 64 mole percent C2-C13 paraffins, and about 2 mole percent C2-C10 olefins. This shows that the originally used monmorillonite impregnated with cobalt was inactive towards the carbon monoxide-hydrogen gas stream while the pillared clay of the present invention when impregnated with cobalt was highly active to such a gas stream.

EXAMPLES XXXV-XXXVI

Montmorillonite was loaded with about 25.8% copper and the pillared clay of Example X formed using sucrose and ethylsilicate, was loaded with about 27.2% by weight copper. When both of these materials were contacted with a gas stream having a ratio of about 2 moles of hydrogen gas per mole of carbon monoxide at a temperature of about 300° C., at a pressure of about 1000 psig, and at a GHSV of about 715, the copper impregnated montmorillonite was inactive. However, the copper impregnated catalyst of Example X converted about 25.6% of the carbon monoxide of the gas stream into products. About 74 mole percent of the product was methanol, about 21 mole percent was higher hydrocarbons and oxygenates ($C_1+$) and about 5 mole percent turned out to be methane.

Examples XXXV-XXXVI show that the original clay impregnated with copper was inactive for the formation of alcohol while the pillared interlayered material of the present invention when impregnated with copper was active for the conversion of carbon monoxide into alcohols. The alcohols and hydrocarbons formed by the pillared catalyst produced by process of the present invention have many uses including extenders for petroleum based gasoline. The carbon monoxide-hydrogen gas stream can readily be produced from coal or biomass.

EXAMPLES XXXVII-XXXVIII

A mixture comprising toluene, phenylhexane, phenyldodocane, phenylpentadodocane and perflourotributylamine was contacted with a sample of montmorillonite and with the pillared interlayered catalyst of Example X at room temperature for about three days. Set forth in the Table below is the calculated length of each molecule of the mixture, the millimoles of each component adsorbed per gram of clay and per gram of pillared interlayered catalyst.

A review of the Table shows that the pillared clay formed by the process of Example X is far more absorbent than the original montmorillonite and will selectively absorb certain sized molecules in preference to others. This can be useful in the separation of molecules having a specific size or size range from a mixture of molecules having other sizes or when it is desired to form molecules of certain sizes.

The above examples are meant to illustrate the process of the present invention and catalyst which can be formed therefrom. Variations and modifications can be made by those skilled in the art without going outside of the scope of the invention as set forth in the following claims.

TABLE

| Adsorbate | Adsorption capacity with different molecular sizes | | |
|---|---|---|---|
| | The calculated length A | m. mole adsorbed on montmor./g | m. mole absorbed pillared inter. montmr/g |
| Toluene | 4.8 | 0.46 | 2.96 |
| Phenylhexane | 11.2 | 0.65 | 2.03 |
| Phenyldodocane | 18.7 | 0.41 | 1.15 |
| Phenylpentadodocane | 22.45 | 0.35 | 1.09 |
| Perflourotributylamine[a] | 14 | 0.33 | 0.77 |

[a] Calculated diameter

What is claimed is:

1. A method of preparing an interlayered pillared clay comprising the steps of mixing a clay with a polar solvent, a soluble carbohydrate, and a soluble pillaring agent; drying said mixture and then heating said mixture at a temperature between 100° to 600° C. to decompose said carbohydrate and form said interlayered pillared clay.

2. The method of claim 1 wherein said clay comprises a smectite clay.

3. The method of claim 2 wherein said clay comprises montmorillonite.

4. The method of claim 1 wherein said carbohydrate comprises a soluble mono or oligosaccharide.

5. The method of claim 4 wherein said soluble mono or oligosaccharide is selected from the group consisting of xylose and sucrose.

6. The method of claim 1 wherein said pillaring agent comprises a metallic or organometallic compound.

7. The method of claim 6 wherein said metallic compound is selected from the compounds of boron, sillicon, aluminum, phosphorus, zinc and magnesium.

8. The method of claim 6 wherein said pillaring agent is selected from the group consisting of soluble siloxane disilanes, trisilanes, silicates, metal isopropoxides, soluble metal salts of acetate, carbonate, and oxalate.

9. The method of claim 8 wherein said pillaring agent is selected form the group consisting of boric acid, diethoxydisilane, hexaethoxydisilane, methysilicate, ethylsilicate, hexaethoxydisiloxane, other alkyl silicates, and aluminum isopropoxide.

10. The method of claim 1 wherein said polar solvent comprises water.

11. The method of claim 1 wherein said polar solvent comprises a liquid alcohol.

12. The method of claim 1 wherein said mixture is heated to a temperature between about 350° C. and 500° C.

13. The method of claim 1 wherein said carbohydrate comprises from about 1 to about 50% by weight of said mixture.

14. The method of claim 13 wherein said carbohydrate comprises from about 3 to about 5% by weight of said mixture.

15. The method of claim 1 wherein said pillaring agent comprises from about 20% to about 80% by weight of said mixture.

16. The method of claim 15 wherein said pillaring agent comprises from about 40 to about 70% by weight of said mixture.

17. The method of claim 1 and further comprising of step of loading said interlayered pillared clay with a catalytic metal.

18. The method of claim 17 wherein said catalytic metal is selected from the group consisting of Group VIII metals of the Periodic Table of Elements.

19. A catalyst formed by the method of claim 17.

20. A catalyst formed by the method of claim 12.

21. A method of preparing an interlayered pillared clay comprising the steps of mixing a smectite clay with water or a liquid alcohol, a soluble mono or oligosaccharide, and a soluble pillaring agent, drying said mixture and then heating said mixture at a temperature between 100° to 600° C. to decompose said carbohydrate and form said interlayered pillared clay.

22. The method of claim 21 wherein said clay comprises montmorillonite.

23. The method of claim 21 wherein said soluble mono or oligosaccharide is selected from the group consisting of xylose and sucrose.

24. The method of claim 21 wherein said pillaring agent is selected from the group of boric acid, hexaethoxydisiloxane, diethoxydisilane, hexaethyoxydisilane, methylsilicate, ethylsilicate and aluminum isopropoxide.

* * * * *